US008620762B2

(12) United States Patent
Kaye

(10) Patent No.: US 8,620,762 B2
(45) Date of Patent: *Dec. 31, 2013

(54) SHIPPING ADDRESS POPULATION USING ONLINE ADDRESS BOOK

(75) Inventor: Evan John Kaye, Short Hills, NJ (US)

(73) Assignee: Panderi Technology Services L.L.C., Wilmington, DE (US)

( * ) Notice: Subject to any disclaimer, the term of this patent is extended or adjusted under 35 U.S.C. 154(b) by 116 days.

This patent is subject to a terminal disclaimer.

(21) Appl. No.: 13/211,238

(22) Filed: Aug. 16, 2011

(65) Prior Publication Data

US 2012/0047440 A1 Feb. 23, 2012

Related U.S. Application Data

(60) Continuation of application No. 12/942,836, filed on Nov. 9, 2010, now Pat. No. 8,015,072, which is a division of application No. 11/850,110, filed on Sep. 5, 2007, now Pat. No. 7,853,487, which is a continuation of application No. 09/918,279, filed on Jul. 30, 2001, now Pat. No. 7,305,427.

(60) Provisional application No. 60/223,154, filed on Aug. 7, 2000.

(51) Int. Cl.
*G06Q 30/00* (2012.01)
*G06F 3/00* (2006.01)

(52) U.S. Cl.
USPC .......................... 705/26.1; 705/27.1; 715/739

(58) Field of Classification Search
USPC ................ 705/26.1, 27.1, 500; 709/217, 219; 715/739

See application file for complete search history.

(56) References Cited

U.S. PATENT DOCUMENTS

| | | | |
|---|---|---|---|
| 5,555,496 A | 9/1996 | Tackbary et al. |
| 5,786,819 A | 7/1998 | Weiser et al. |
| 5,835,735 A | 11/1998 | Mason et al. |
| 5,956,483 A | 9/1999 | Grate et al. |
| 6,052,710 A | 4/2000 | Saliba et al. |
| 6,125,352 A | 9/2000 | Franklin et al. |
| 6,185,582 B1 | 2/2001 | Zellweger et al. |
| 6,199,099 B1 | 3/2001 | Gershman et al. |
| 6,587,835 B1 | 7/2003 | Treyz et al. |
| 6,609,106 B1 | 8/2003 | Robertson |
| 6,611,814 B1 | 8/2003 | Lee et al. |
| 6,633,903 B1 | 10/2003 | Gould |
| 6,657,702 B1 | 12/2003 | Chui et al. |
| 6,687,362 B1 | 2/2004 | Lindquist et al. |
| 6,801,340 B1 | 10/2004 | Endo |
| 6,829,607 B1 | 12/2004 | Tafoya et al. |

(Continued)

OTHER PUBLICATIONS

Kalish, David E., "Amazon.com Buys to Up Sales Power" *Denver Post*, Wed1 Ed., p. C-03, Aug. 5, 1998, pp. 1-2.

(Continued)

*Primary Examiner* — Nicholas D Rosen
(74) *Attorney, Agent, or Firm* — Perkins Coie LLP

(57) ABSTRACT

A method for automatically generating a custom name list for use in an order form which can be submitted to an Internet shopping site to complete an order. The method utilizes address book data, stored primarily online utilizing a third party service. In one method according to the invention, names and addresses are read from an address book database and incorporated into a form which enables the user to easily select recipients for one or more gifts.

19 Claims, 17 Drawing Sheets

(56) References Cited

U.S. PATENT DOCUMENTS

| | | | |
|---|---|---|---|
| 6,850,901 | B1 | 2/2005 | Hunter et al. |
| 6,873,967 | B1 | 3/2005 | Kalagnanam et al. |
| 6,917,922 | B1 | 7/2005 | Bezos et al. |
| 6,931,419 | B1 | 8/2005 | Lindquist |
| 6,937,997 | B1 | 8/2005 | Parulski |
| 6,963,850 | B1 | 11/2005 | Bezos et al. |
| 7,016,865 | B1 | 3/2006 | Weber et al. |
| 7,024,464 | B1 | 4/2006 | Lusher et al. |
| 7,082,407 | B1 | 7/2006 | Bezos et al. |
| 7,305,427 | B2 | 12/2007 | Kaye |
| 7,853,487 | B2 | 12/2010 | Kaye |
| 8,015,072 | B2 * | 9/2011 | Kaye .......................... 705/26.1 |
| 2001/0054009 | A1 | 12/2001 | Miller et al. |
| 2002/0059379 | A1 | 5/2002 | Harvey et al. |
| 2003/0069874 | A1 | 4/2003 | Hertzog et al. |
| 2005/0075925 | A1 | 4/2005 | Sash |
| 2011/0082760 | A1 | 4/2011 | Kaye |

OTHER PUBLICATIONS

Kalish, David E., "Amazon.com's Buying Spree Has Netizens Abuzz", *Arizona Republic*, Final Chaser Edition, p. E1, Aug. 5, 1998, pp. 1-2.

Woods, Bob, Microsoft Jumps at Calendaring Service for MSN, *Newbytes*, Apr. 26, 1999, pp. 1-2.

"America Online Wants to Widen Its Reach Past Personal Computers Version 5.0: Software Update is Geared to Also Offering Services through Wireless Phones and Hand-held Organizers", *Atlanta Constitution*, Home Edition, p. D3, Oct. 6, 1999, pp. 1-2.

Fried, John, "Some Ways to Ward off a Nasty Virus", *Philadelphia Inquirer*, SF edition, p. D01, Mar. 31, 1999, 3 pages.

Burke, J.P., "SME 2.0 Answers the Mail and Fax Siren Call", *HP Professional*, vol. 9, No. 10, p. 16, Oct. 1995.

Pearlstein, J., "Boston Hosts Debut of Mac E-Mail Tools", *MacWEEK*, vol. 11, No. 32, p. 23, Aug. 18, 1997.

United States Patent and Trademark Office, Non-Final Office Action, U.S. Appl. No. 11/850,110, mailed Dec. 7, 2009, 18 pages.

United States Patent and Trademark Office, Final Office Action, U.S. Appl. No. 11/850,110, mailed May 14, 2010, 15 pages.

United States Patent and Trademark Office, Notice of Allowance, U.S. Appl. No. 11/850,110, mailed Aug. 3, 2010, 11 pages.

United States Patent and Trademark Office, Notice of Allowance, U.S. Appl. No. 12/942,836, mailed Apr. 25, 2011, 14 pages.

United States Patent and Trademark Office, Non-Final Office Action, U.S. Appl. No. 09/918,279, mailed Dec. 21, 2004, 8 pages.

United States Patent and Trademark Office, Final Office Action, U.S. Appl. No. 09/918,279, mailed Jul. 19, 2005, 11 pages.

United States Patent and Trademark Office, Advisory Action, U.S. Appl. No. 09/918,279, mailed Sep. 29, 2005, 3 pages.

United States Patent and Trademark Office, Non-Final Office Action, U.S. Appl. No. 09/918,279, mailed Dec. 27, 2005, 14 pages.

United States Patent and Trademark Office, Final Office Action, U.S. Appl. No. 09/918,279, mailed Jun. 8, 2006, 15 pages.

United States Patent and Trademark Office, Non-Final Office Action, U.S. Appl. No. 09/918,279, mailed Jul. 31, 2006, 16 pages.

United States Patent and Trademark Office, Final Office Action, U.S. Appl. No. 09/918,279, mailed Jan. 18, 2007, 15 pages.

United States Patent and Trademark Office, Advisory Action, U.S. Appl. No. 09/918,279, mailed Apr. 3, 2007, 5 pages.

United States Patent and Trademark Office, Notice of Allowance, U.S. Appl. No. 09/918,279, mailed Jun. 15, 2007, 6 pages.

* cited by examiner

US 8,620,762 B2

SHIPPING ADDRESS POPULATION USING ONLINE ADDRESS BOOK

RELATED APPLICATIONS

The present application is a continuation of U.S. patent application Ser. No. 12/942,836 filed Nov. 9, 2010, now U.S. Pat. No. 8,015,072, which is a divisional of U.S. patent application Ser. No. 11/850,110 filed Sep. 5, 2007, now U.S. Pat. No. 7,853,487, which is a continuation of non-provisional patent application Ser. No. 09/918,279, filed Jul. 30, 2001, now U.S. Pat. No. 7,305,427, all of which are incorporated by reference herein in their entireties, and for which benefit of the priority date is hereby claimed. The non-provisional patent application Ser. No. 09/918,279 claims benefit of the priority date, as does this application, of provisional patent application 60/223,154, filed on Aug. 7, 2000.

FIELD OF THE INVENTION

The present invention relates to methods for generating shipping address entries to provide a customized recipient list in support of electronic commerce transactions.

BACKGROUND OF THE INVENTION

Many personal and corporate gifts are purchased on the Internet and shipped directly to specified gift recipients. The user currently is required to populate a web page form with each recipient's shipping address, a time-consuming process—particularly if multiple gifts are to be sent.

Some Internet shopping sites have addressed this problem by maintaining a list of previous names and corresponding addresses to which a given user has shipped goods. On returning to the site, the user can be presented with such a list and may elect to send a further gift to one of the recipients again without having to reenter the address data. That arrangement, however, requires the user to confirm or know that the address information being maintained by that site is still correct, and only concerns recipients who have previously received gifts. The Internet site does not have a reason to stay current with the addresses nor does it have access to the user's address book data.

What remains needed in the art is a method by which an Internet shopping site can offer a user the convenience of selecting a recipient from a comprehensive customized name list, and not require that the user enter the shipping details for a chosen person on that list; even if it is the first time that a person is chosen.

What is further needed in the art and has heretofore not been available is a method by which an Internet shopping site can be enabled to read, with the user's permission, the user's client station address book data and incorporate that data into a customized name list.

SUMMARY OF THE INVENTION

The present invention provides a method for an Internet shopping site to enable its users to select gift recipients from an automatically generated customized name list.

The inventive method does not require a user to have previously entered the addresses into a shipping information form provided by the web site in order for the order to be processed.

The invention thus provides an Internet shopping site with two distinct competitive advantages. Firstly, online order completion can be done faster than the conventional method in which manual entry is made of all recipient names and corresponding addresses. Secondly, increased sales can result by reminding users of potential gift recipients in their address book who they may have forgotten or alternatively they did not have the inclination to make the effort to enter their addresses on a conventional shipping information form.

In one aspect of the invention, a method is disclosed for reading names and addresses from an address book database and incorporating such data into a web form such that a user may easily select the person, or people, to which a gift, or multiple different gifts, is to be sent. The address book database resides on a machine that is remote from the web server that supports e-commerce. It will usually reside on the client station but may reside on another workstation or server as in the case where the user uses shared files through an ASP, extranet, local area network, or otherwise.

In a related aspect, the invention provides a method for assessing the number and types of address book databases residing on the remote machine and reading the data in one or more of those address books.

A further aspect of the invention provides a method for generating on the client station, as opposed to the World Wide Web server, a customized name selection form that is then displayed in the browser. The advantage to such client side form generation is that the full contents of the address book need not leave the client station; thus ensuring privacy of the address book contents.

These and other features, aspects and advantages of the present invention can be further appreciated from the accompanying Figures, Description of the Figures and Detailed Description of the Preferred Embodiment.

DETAILED DESCRIPTION OF THE PREFERRED EMBODIMENT

By way of overview and introduction, a method in accordance with a preferred embodiment of the invention provides a simple two step process for the completion of shipping information by the user of an online shopping web site. First, the user is presented with a web page form comprising the previously selected electronic shopping cart items and names read from an address book. The user matches gifts to respective recipients by a simple selection process and submits the form. Second, a shipping address form is generated with the recipients' names and corresponding shipping addresses already entered as default values in the fields. The user need only make necessary changes or complete the form where address details were not available in the address book entry. The user may then submit the form before entering additional recipients and billing information in the conventional way.

Figure 1:
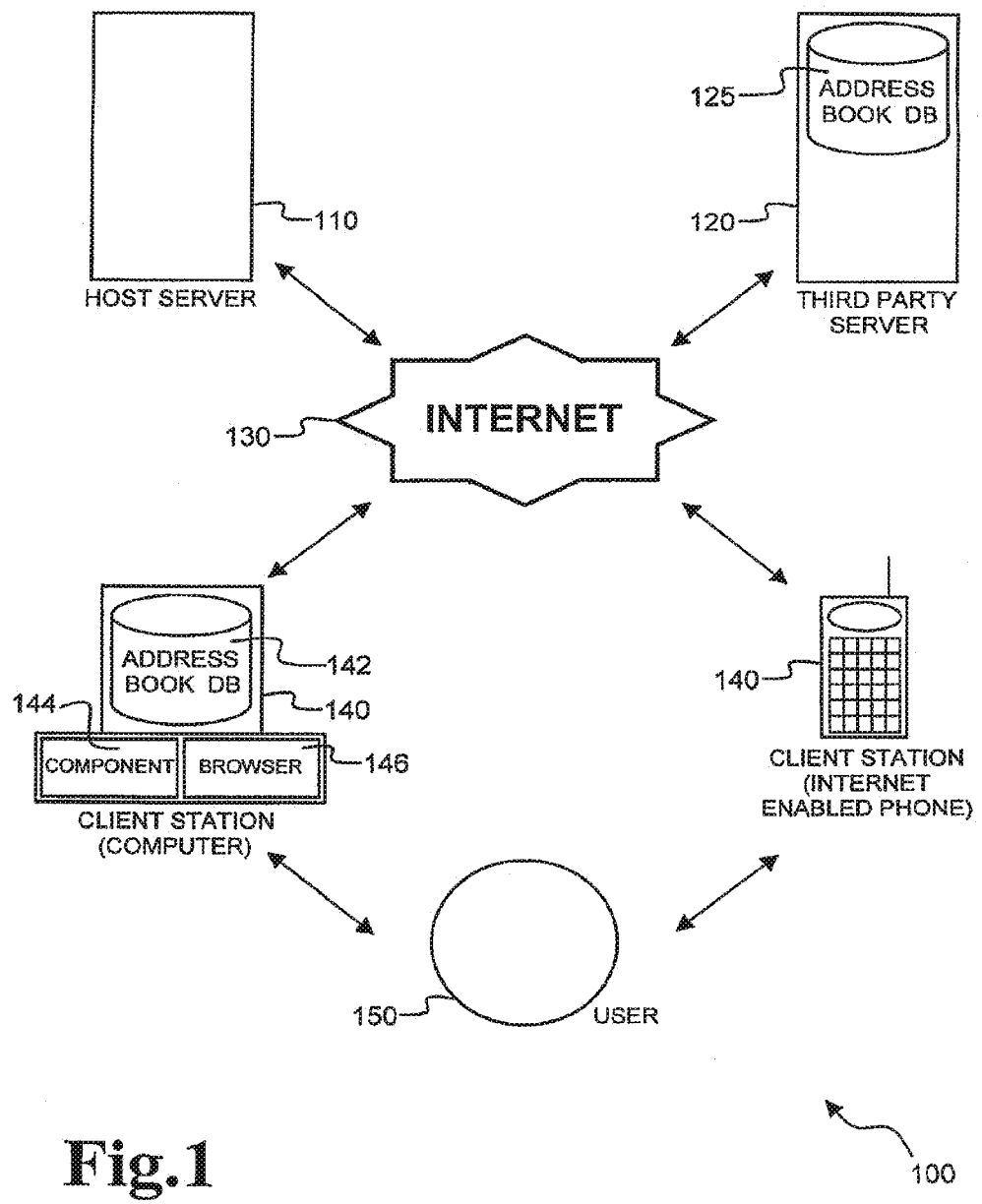
FIG. 1 illustrates a network arrangement of hardware, software and user components for implementing a method in accordance with a preferred embodiment of the invention.

With reference now to FIG. 1, a network arrangement of hardware components for implementing a method in accordance with the present invention is described. The network 100 includes a host server 110 which provides content over the Internet 130 to a plurality of distributed users that access the host server 110 through client stations or machines 140. The content provided by the host server 110 can be viewed by users through a World Wide Web browser 146 or other functionally equivalent software running at their respective client stations 140. In addition to content, the host server 110 downloads and executes a software component 144 on the client station 140 which implements, along with other components of the described network 100, the method of the preferred embodiment, as described below in connection with FIGS. 2-15. The component 144 is proprietary to the inventive method and may be in the form of ActiveX or other similar software structure. The client stations or machines 140 can assume a variety of forms, including a home computer, a PDA, an Internet compliant telephone, or other Internet compliant communications device.

The host server 110 is configured to support electronic commerce and provide goods and/or services for purchase or lease by the users who access it. The host server 110 preferably communicates with other components of the network through a secure connection as understood by those of skill in the art. Address book data can be read from the client station address book database 142, from a third party address book database 125, or from some other location. Through the use of a third party server 120, users can send gifts to people for whom they may only know a name and/or email address, and the recipient's address can be maintained private and unknown to the user. A third party server 120 also can be used to implement some of the method processes described herein.

The host server 110, third party server 120 and plural client stations 130 are all configured to communicate with one another in a conventional manner over communication link through the Internet 130. In lieu of the Internet, communications can be through an Intranet or Extranet, as understood by those of skill in the art.

There is also represented the user 150 which interacts with the client stations 140.

Figure 2:
FIG. 2 shows an exemplary form (selection form) for selecting gift recipients and their respective gifts in accordance with the preferred embodiment of the invention.

FIG. 2 illustrates an exemplary selection form 200 for selecting gift recipients and their respective gifts in accordance with the preferred embodiment of the invention. The selection form 200 can be generated on the host server 110, third party server 120, or at the client station 140, and can be implemented as an HTML file having form tag pairs and suitable input fields between the form tags, or as an ActiveX, JavaScript, DHTML or other component that executes on the client station, as understood by those of skill in the art.

The name selection form 200 is divided into four region types: header region 210, gift display panel 220, selection grid region 230 and footer region 250. The header region 210 can include header text and graphics associated with a particular vendor or web site.

Below the header region, the gift display panel 220 comprises a display of the gifts that have been selected and included in an electronic shopping basket by the user. The gifts are selected from an online store in a conventional way. Each gift entry on the gift display panel 220 comprises an image 224, description 226 and price 228. The gift display panel 220 is divided into columns 222 with each gift occupying a unique column. The gift display panel 220 is preferably repeatedly displayed after a predetermined number of row entries in the selection grid (described next) to ensure that at least one gift display panel 220 is visible at any vertical scroll position of the selection form 200. There may be limited horizontal space on the name selection form 200 to display a large selection of gifts from the electronic shopping cart. This problem may be addressed by limiting the gift selection, decreasing the width of column 222 or staggering the gift images and text. The problem of too few items in the electronic shopping cart may be addressed by the software selecting suggested gifts or gift certificates to augment the selections of the user.

The selection grid 230 resides below the gift display panel 220. Multiple selection grids 230 can be provided as shown. The selection grid 230 comprises a plurality of vertical columns 234 and horizontal rows 236 intersecting to form discrete cells 242. The columns 234 preferably are aligned with the gift display panel columns 222. The cells in the first column 232 of the selection grid 230 contain names 244 from an address book. The remaining cells in the selection grid 230 contain selectable regions 238/240. By changing an unselected region 240 to a selected region 238, the user indicates that the shopping cart item 224 in the column should be ordered and shipped to the person 244 in the row. The user makes such a change by selecting the selectable area of the cell. There are also buttons 246 in each row which the user may select in order to clear the respective row of any selections.

It is preferable to design the form such that only one gift may be selected at any given time for a particular individual 244 by grouping radio buttons in each row 236. Such design will prevent multiple gifts being inadvertently ordered for the same recipient. The user may override this functionality by electing to have check boxes instead of radio buttons on the form, as this would allow for multiple gifts to be selected for a given person.

The selection grid 230 can indicate that a corresponding address for a person has been found in an address book using flags next to the person's name or by displaying that person's name in a different color. Such an indication can aid the user in deciding on gift recipients. Such indicators can be enabled when the names and addresses are read concurrently. The selection grid 230 can even display the read addresses to the user on the selection form 200, although it is preferable to keep such data embedded and invisible to the user if it needs to be in the form for data transfer purposes, as described below.

At the bottom of the selection form 200 is the footer region 250 that contains a button 252 the user selects to submit the form to the host server 110, third party server 120 or software running on the client station 140 itself.

Figure 3:
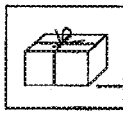
FIG. 3 shows an exemplary form (shipping information form) for correcting and completing names and addresses of gift recipients in accordance with the preferred embodiment of the invention.

FIG. 3 shows an exemplary shipping information form for correcting and completing the names and addresses of gift recipients after the user completes the name selection form 200 of FIG. 2. The form 300 has various input fields included between HTML form tags or in an embedded component. The header region 310 comprises branding header text and graphics. Below the header region 310 is a plurality of recipient sections 320 and 340. Each recipient section has form input fields containing default values specific to the recipient. The number of recipient sections included in the form 300 is equal to the number of names that were selected when completing form 200. Names that were not selected when completing the form 200 preferably are not displayed on the shipping information form 300.

Address information for Recipient 1 is automatically populated from the address book 125 or 142 and is displayed as default values in the first section 320. First and last name 322a, 322b, telephone number 324, address 326a-326e and company name 328 are the input fields changeable by the user. The first section 320 also can contain selectable fields for shipping priority 336 and gift details 330-334. The gift details can include a gift image 330, gift description 332 and gift price 334. The gift displayed preferably corresponds to the gift selected for the recipient on the selection form 200.

The second recipient's section 340 illustrates a case where a name selected on the selection form 200 of FIG. 2 had incomplete address information resulting in fields without default values being displayed on the shipping information form 300. The user is required to complete the address fields 342a-342e so that the host server 110 can send the gift to that recipient. The user selects the Next button 350 once satisfied with the entries.

In addition, either or both the Forms 200 and 300 can include input form fields for entering custom messages for each recipient. Alternatively, several messages can be entered before the selection form 200 is displayed, with additional columns being displayed to allow the user to select one of the custom messages to be included with the selected gift item. This permits a custom message to be entered once, yet used with several gift recipients.

Figure 4A:
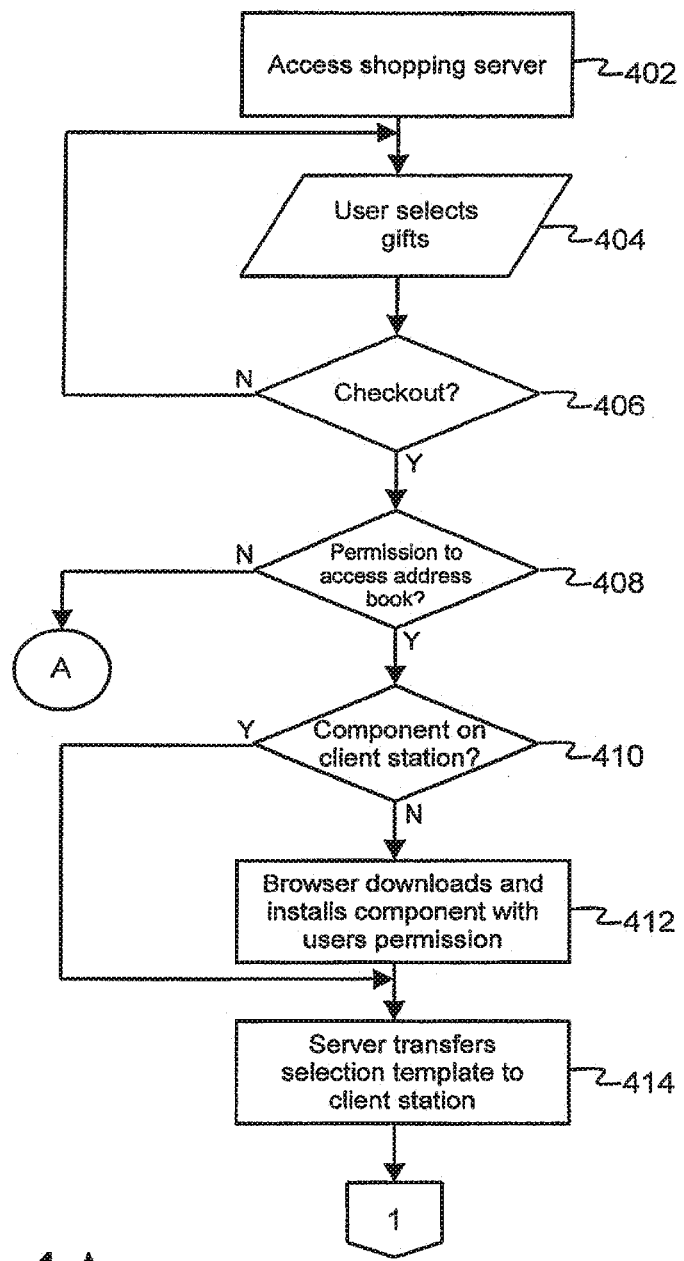
FIGS. 4A-C illustrates a process flow by which a user interactively shops online with a web site in accordance with one variation of the inventive method.
Figure 4B:
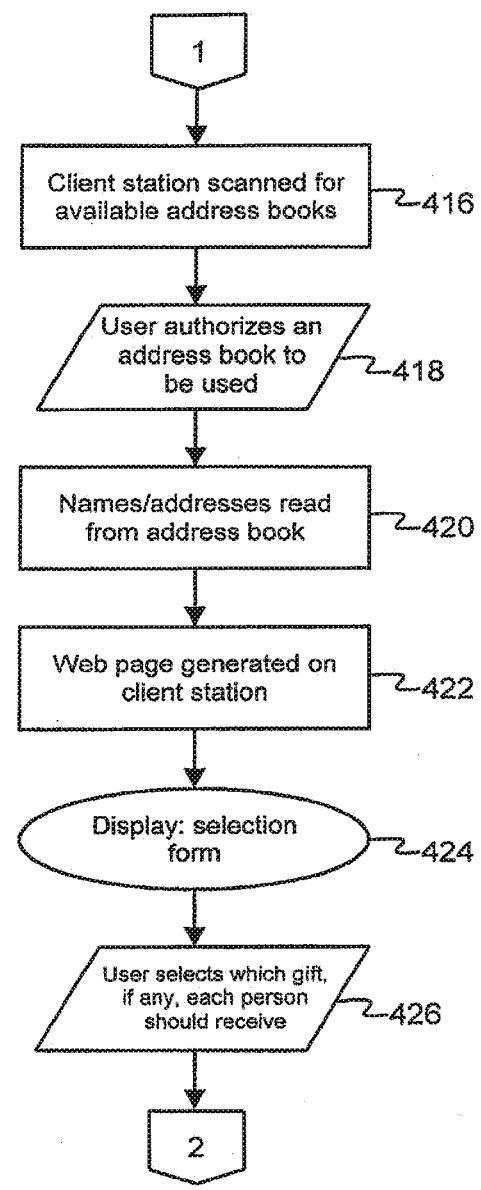
Figure 4C:
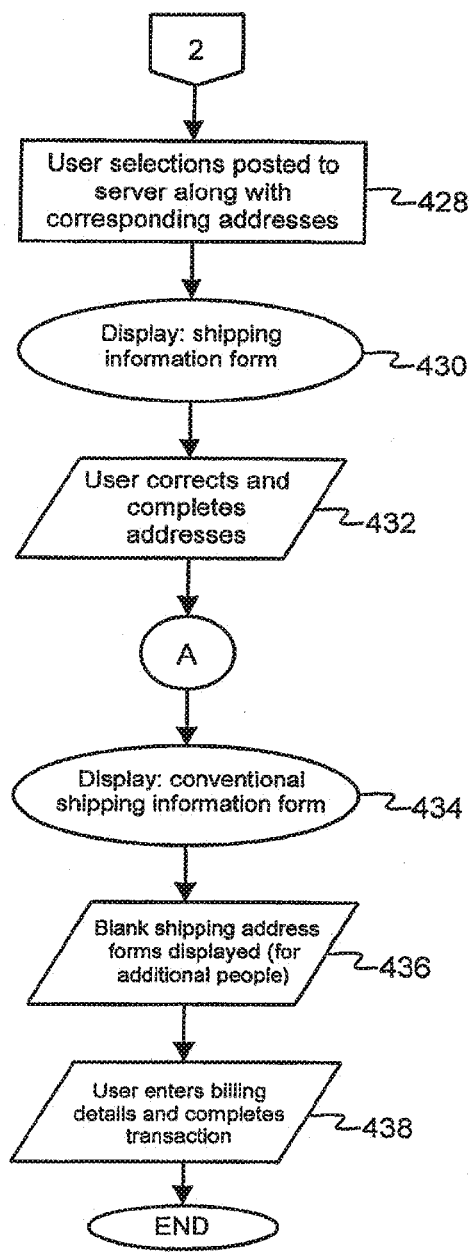

The process flow of FIGS. 4A-C illustrates the steps that a user takes at an online shopping site. At step 402, the user accesses the host server 110 from the client station 140. The user selects gifts from an online store in a conventional way by adding gifts to an electronic shopping basket at step 404. Once finished selecting gifts, the user proceeds to checkout at step 406. At step 408 the user is prompted with a permission request to access the address book 142 on the client station 140. If the user does not give permission, the completion of shipping details proceeds in a conventional manner. However, if the user grants permission, or if permission was granted from a prior session (e.g., as stored in a cookie) as can be automatically tested by the host server 110, the process flow continues at step 410 with the inventive method in which a test is made for the existence of a necessary component 144, ActiveX or similar, on the client station 140 that is proprietary to the inventive method and which interacts with address book data as described below. If present, the process continues at step 414; alternatively, the component 144 is downloaded to the client station 140 at step 412. The user may need to give permission for the component 144 to be downloaded and installed on the client station 140 depending on the security settings of the operating system, firewall or web browser.

At step 414 a selection template is downloaded from the host server 110 to the component 144. The selection template contains formatting information as well as data pertaining to gifts resident in the electronic shopping basket (e.g., descriptions, prices and references to images of the gifts).

As shown in FIG. 4B, the component 144 scans the client station 140 for available address books at step 416 and allows the user to select which address book should be accessed at step 418. More than one address book may be used by the component 144. Also, the component 144 can access selected portions of any of those address books, so that, for example, only particular categories of entries are retrieved. For example, the component 144 can retrieve entries which have been categorized by the user. A non-limiting list of such categories includes personal (family and/or friends), business, school, children, social, and club members. In this regard, an optional page can be provided to the user in which the user selectively grants differing permission levels for access by the component 144, as a function of the user's current needs or desires.

At step 420, the component reads names and addresses in the specified address book(s) and generates a name list. The component creates a selection form at step 422 such as form 200 of FIG. 2, at the client machine by combining the name list with the selection template (which was preferably previously downloaded from the host server). Recipients' address information is preferably embedded in the selection form and is invisible to the user (e.g., it is a hidden field in the selection form). At step 424 the selection form is displayed on the client station 140. The user can select which gift, if any, each person on the selection form is to receive. The user indicates the selection of gifts for individual recipients by selecting appropriate selectable areas on the selection form at step 426. The user then posts the form with the embedded address information to the host server at step 428 (see FIG. 4C).

At step 430, the gift recipients' information is displayed to the user for correction or confirmation in a form such as form 300 of FIG. 3. The user makes necessary changes at step 432 and submits the form. The user is then presented at step 434 with a conventional shipping information form which permits additional gift recipients who are not included in the address book to be entered and submitted to the host server 110. The user also can indicate whether the additional gift recipients should be added to the address book 142. The client resident component 144 manages any address book additions or changes that may be entered by the user during the course of the purchase transaction. At step 438 the user enters the billing information and completes the transaction in a conventional way.

As understood by those of skill in the art, the process flow in the context of an object-oriented environment such as the graphical or form interface presented on the World Wide Web, need not be executed in the order presented in a conventional flow diagram. Rather, process flows can be driven dynamically in response to user actions. Regarding form submission, as understood by those of skill in the art, a client-side Active X component, Javascript, Visual Basic Script, DHTML or equivalent can be used to test the form for completeness prior to posting, with suitable prompts given to the user to guide the user toward completing the form. Thus, for example, the address book can be accessed (step 420) prior to the user selecting any gifts (step 404) to inform the user of the potential gift recipients in his or her address book for whom the user might wish to select a gift.

Figure 5:
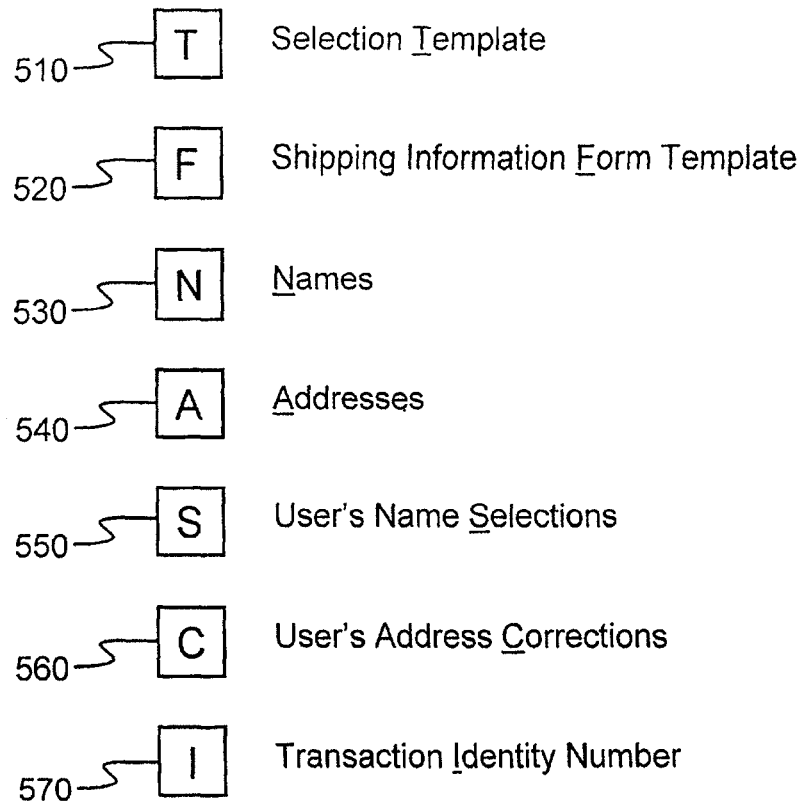
FIG. 5 serves as a legend for symbols used in FIG. 6-15.

FIG. 5 serves as a legend for symbols used in FIGS. 6-15. Block [T] 510 indicates a template containing formatting information for the selection form. Formatting information is divided into the four regions of the form substantially described above in connection with form 200 of FIG. 2. It also contains data pertaining to the gift items which may have already been selected or which are available for selection, including graphic images or appropriate references to them.

Block [F] 520 indicates a template containing formatting information for the shipping information form. It contains formatting information for the various input fields and gift display regions of the form 300, described above in connection with FIG. 3.

Block [N] 530 and Block [A] 540, respectively, indicate the names and addresses read from a user-specified address book. Block [S] 550 indicates the user's selections of names, and the gift types corresponding to the selection, on the selection form 200. Block [C] 560 indicates the corrections to addresses entered by the user using the shipping information form 300.

Block [I] 570 indicates a unique identity number assigned to the current transaction. The transaction identity number [I] contains identity information specific to the online shopping site and can be used by a third party service to identify and bill the shopping site for its services, for example, on a per transaction basis. The transaction identity number [I] can identify each transaction, if necessary. The transaction identity number [I] can occasionally include alphanumeric information with information pertaining to gifts in the user's electronic shopping cart for generating the gift display panel 220 of the selection form.

Figure 6:
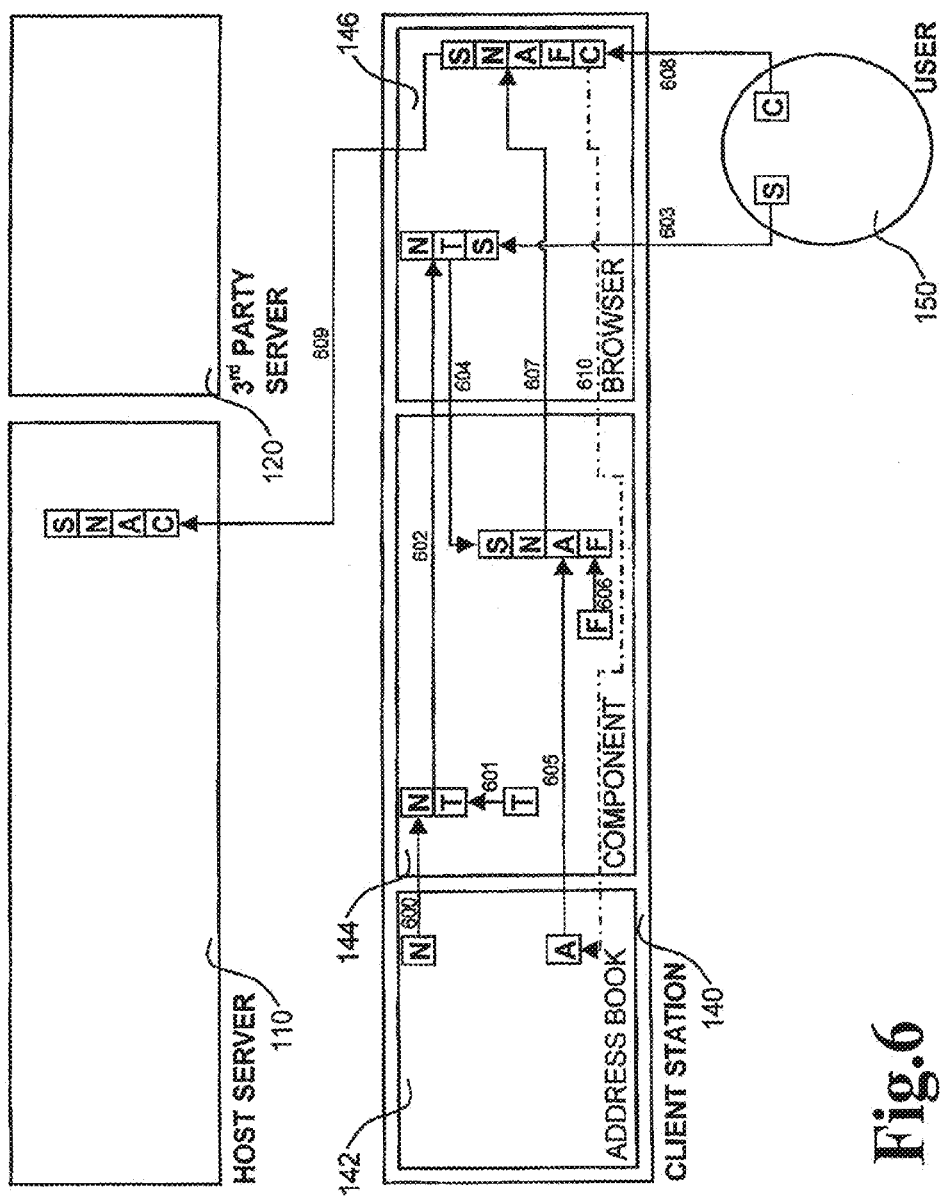
FIG. 6 illustrates a data flow that uses templates built into the client station component to construct web pages on the client station.

FIG. 6 illustrates a data flow process whereby the names [N] are read (600) from an address book on the client station by the component 144 and formatted (601) using a component-resident selection template [T] to define a selection form [T] [N] which is displayed (602) through the browser 146. The user 150 selects [S] (603) names and respective gifts and this data is sent back (604) to the component 144 where it is combined (605) with the corresponding address data [A] from the client station's address book 142 and formatted (606) using a component resident shipping information form template [F] to define a shipping information form. The shipping information form is sent (607) to the browser 146 so that the user 150 can interact (608) to make any corrections [C] that may be necessary. The form is then posted (609) to the host server 110 where the selected names [S] [N] and addresses [A], and corrected addresses [C] are used along with the corresponding gift information to proceed with the order. Any address corrections also can be provided to the address book (610).

Figure 7:
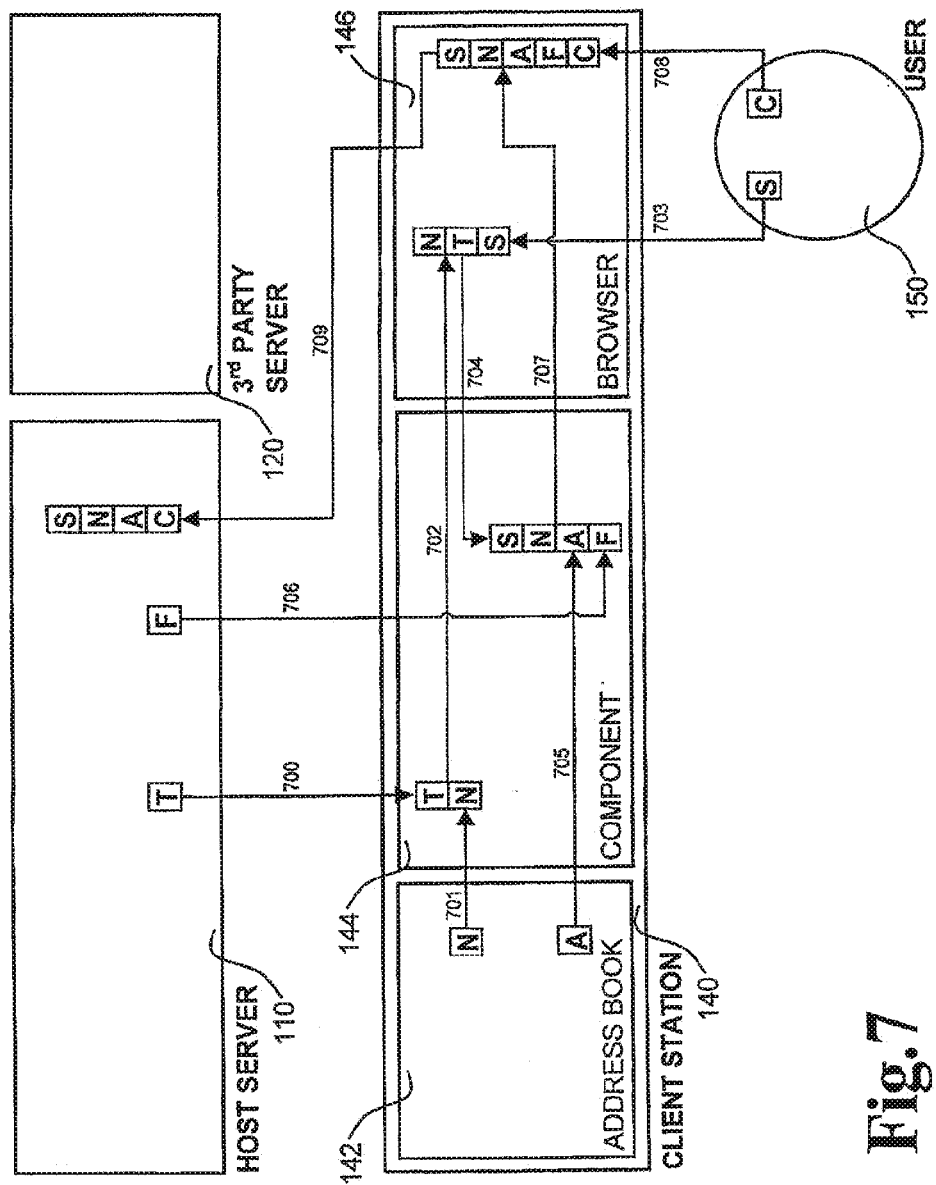
FIG. 7 illustrates a data flow that uses templates passed to the client station component from the host server to construct web pages on the client station.

FIG. 7 illustrates a data flow process whereby a selection template [T] is downloaded from the host server 110 to the component 144 and combined with names [N] read from the address book 142 to define a selection form [T][N] which is displayed (702) through the browser 146. The user 150 selects [S] (703) names and respective gifts and this data is sent back (704) to the component 144 where it is combined (705) with the corresponding address data [A] from the address book 142 and formatted (706) with the shipping information form template [F], which is also downloaded from the host server 110, (e.g., when the template [T] is downloaded), to define a shipping information form. The shipping information form is sent (707) to the browser 146 so that the user 150 can interact (708) with that form and make any necessary corrections [C]. The form is then posted (709) to the host server 110 where the selected names [S] [N] and addresses [A], and corrected addresses [C] are used along with the corresponding gift information to proceed with the order.

Figure 8:
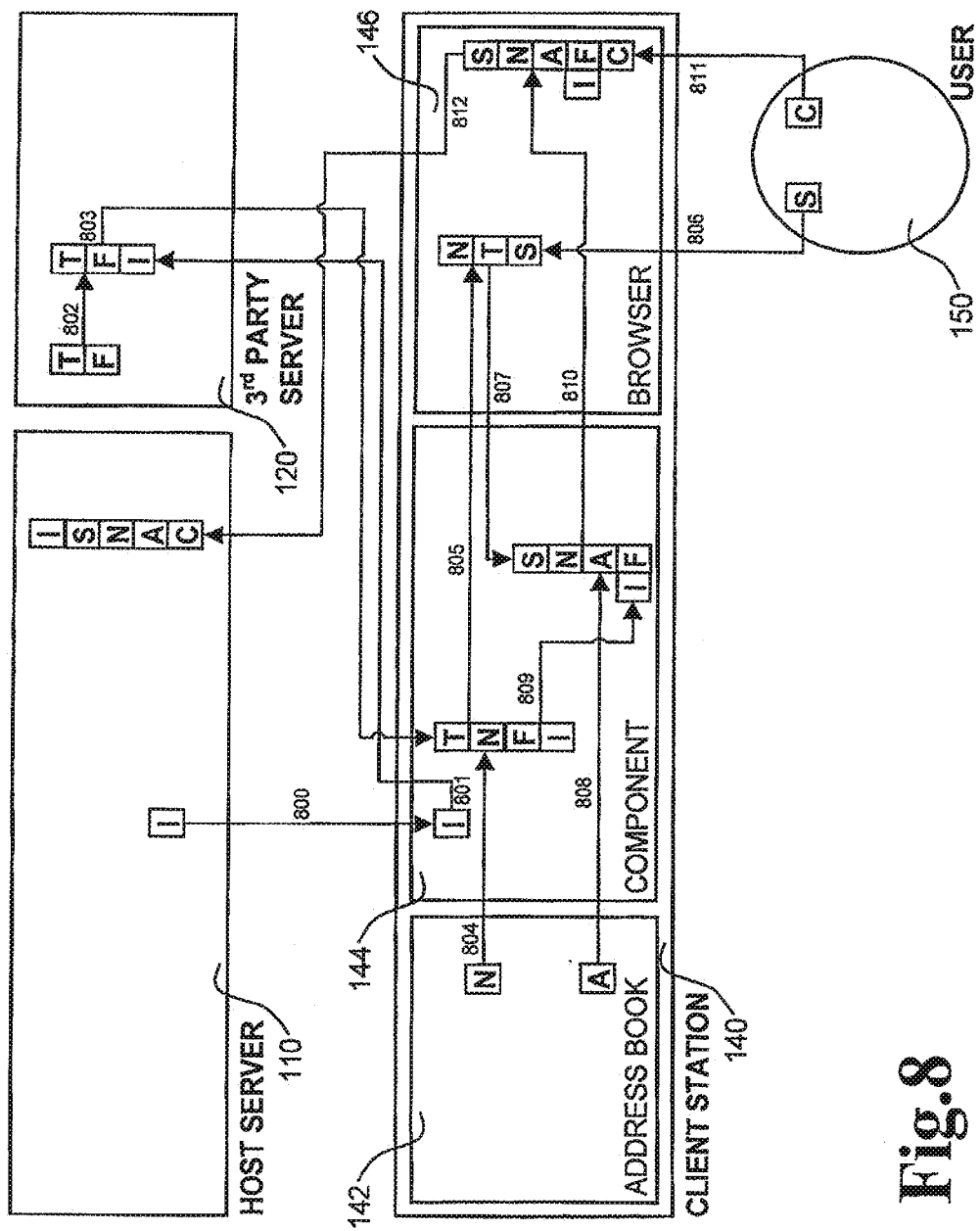
FIG. 8 illustrates a data flow that uses templates passed to the client station component from a third party server to construct web-pages on the client station.

FIG. 8 illustrates a data flow process in which a transaction identity number [I] is sent (800) from the host server 110 to the client station component 144. The transaction identity number [I] contains a code specific to the host server 110 shopping site and specific to the transaction. The component 144 polls (801) a third party server 120 using the transaction identity number [I]. The third party server 120 responds by locating (802) and downloading (803) the applicable selection template [T] and shipping information form template [F] to the component 144 along with the original transaction identity number [I]. The selection template [T] is then combined with names [N] read (804) from the client station address book 142 to define a selection form that is displayed (805) through the browser 146. The user 150 selects [S] (806) names and respective gifts and this data is sent back (807) to the component 144 where it is combined with the corresponding address data [A] read (808) from the address book 142. The combined data is then formatted (809) with the shipping information form template [F], previously sent from the third party server 820, to define a shipping information form that includes the transaction identity number [I]. The shipping information form is sent (810) to the browser so that the user 150 can interact (811) with that form and make any necessary corrections [C]. The form is then posted (812) to the host server 110 where the selected names [S] [N] and addresses [A], and corrected addresses [C] are used along with the transaction identity number [I] and corresponding gift information to proceed with the order.

It can be appreciated that in all the variations of data flow described above in connection with FIGS. 6-8, the web page forms were constructed by the client-side component 144. In FIG. 6, both templates [T and F] were resident and specific to the component 144; such data flow may be preferred if only one shopping site uses the client-side component 144. In FIG. 7, both templates [T and F] were passed to the client-side component 144 from the host server 110; such data flow is conducive to multiple host servers from different shopping sites accessing the same client side component 144 whilst still providing custom forms specific to each shopping site. The data flow in FIG. 8 has both templates [T and F] passed from a third party server 120, and allows for shopping sites to outsource template maintenance and hosting while still achieving branding customization of the forms specific to the shopping site. It also allows for the third party servers' administrators to centrally track the use of client-side components 144 and bill shopping site hosts in accordance with such usage.

Figure 9:
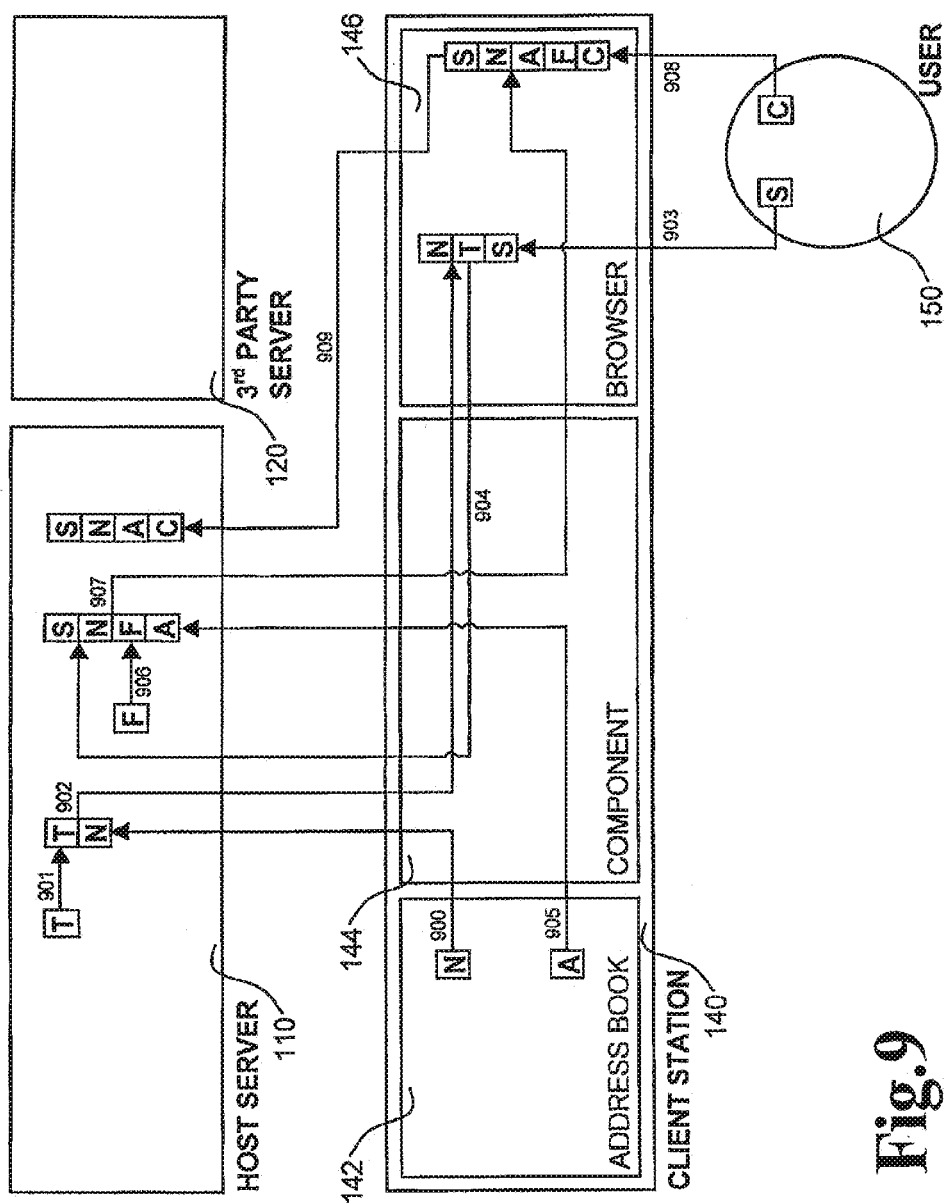
FIG. 9 illustrates a data flow that uses templates on the host server to construct web pages on the host server.

FIG. 9 illustrates a data flow process that differs from FIGS. 6-8 in that the web page forms are constructed on the host server 110. Both templates [T and F] remain resident on, and specific to, the host server 110. The names [N] are read (900) by the client side component 144 and passed directly to the host server where they are formatted (901) with a host server resident selection template [T] to form a selection form that is downloaded (902) and displayed on the client station browser 146. In other words, the selection form is populated with data from the designated address books on the client station 140. The user 150 selects [S] (903) names and respective gifts and this additional data is sent back (904) to the host server 110 where it is combined with corresponding address data [A] read (905) by the component 144 and passed directly to the host server 110. The combined data is then formatted (906) with the host server resident address correction template [F] to define a shipping information form. The shipping information form is then downloaded (907) and displayed on the client station browser 146 so that the user 150 can interact (908) with that form and make any necessary corrections [C]. The form is then posted (909) to the host server 110 where the selected names [S] [N] and addresses [A], and corrected addresses [C] are used along with the corresponding gift information to proceed with the order.

Figure 10:
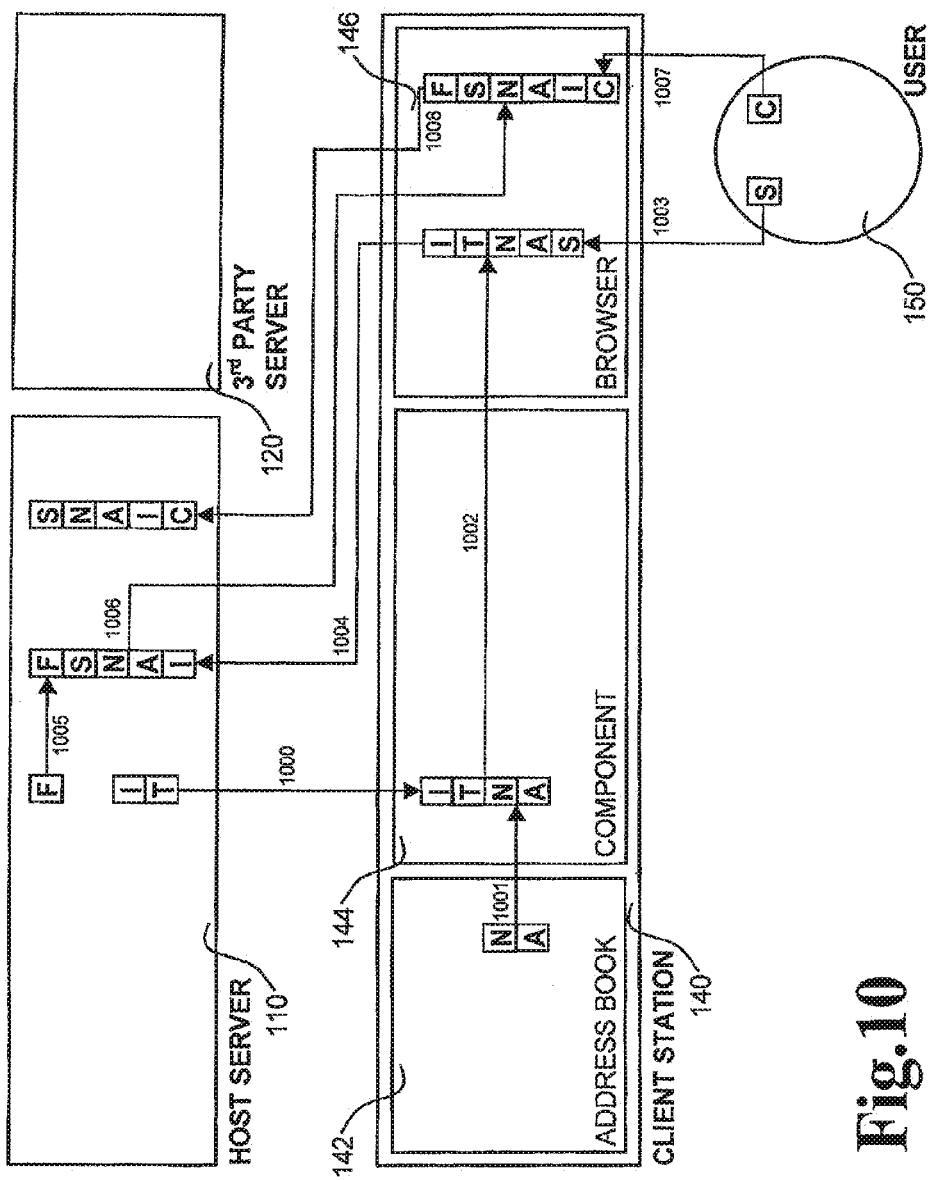
FIG. 10 illustrates a data flow that uses a template passed to the client station component from the host server followed by a template resident on the host server to construct web pages at respective sites.

FIG. 10 illustrates a data flow process that combines elements of FIG. 9 with elements of the data flow constructions of FIGS. 6-8. Here the selection form is constructed by the client side component 144 whereas the shipping information form is constructed by the host server 110. A transaction identity number [I] along with a shopping site specific selection template [T] is passed (1000) to the component 144 and both are combined with names [N] and addresses [A] read (1001) by the component 144 to form a selection form. The selection form is then displayed (1002) through the browser 146. The user 150 selects [S] (1003) names and respective gifts and this data is posted (1004) to the host server 110 along with corresponding addresses [A] embedded in the form but invisible to the user. A client side script may be used, as understood by those of skill in the art, to post to the host server 110 only those addresses corresponding to names selected by the user 150. The posted data is then formatted (1005) with the host server resident shipping information form template [F] to form a shipping information form. The shipping information form is then downloaded (1006) and displayed on the client station browser 146 so that the user 150 can interact (1007) with the form and make any necessary corrections [C]. The form is then posted (1008) to the host server 110, as previously described.

The advantage of the data flow in FIG. 10 is that only user selected names and addresses leave the client station; a process conducive to preserving information privacy as with FIG. 6-8. Also, by constructing the shipping information form on the server side, readily available server-side scripting protocols (Active Server Pages for example) can be used.

Figure 11:
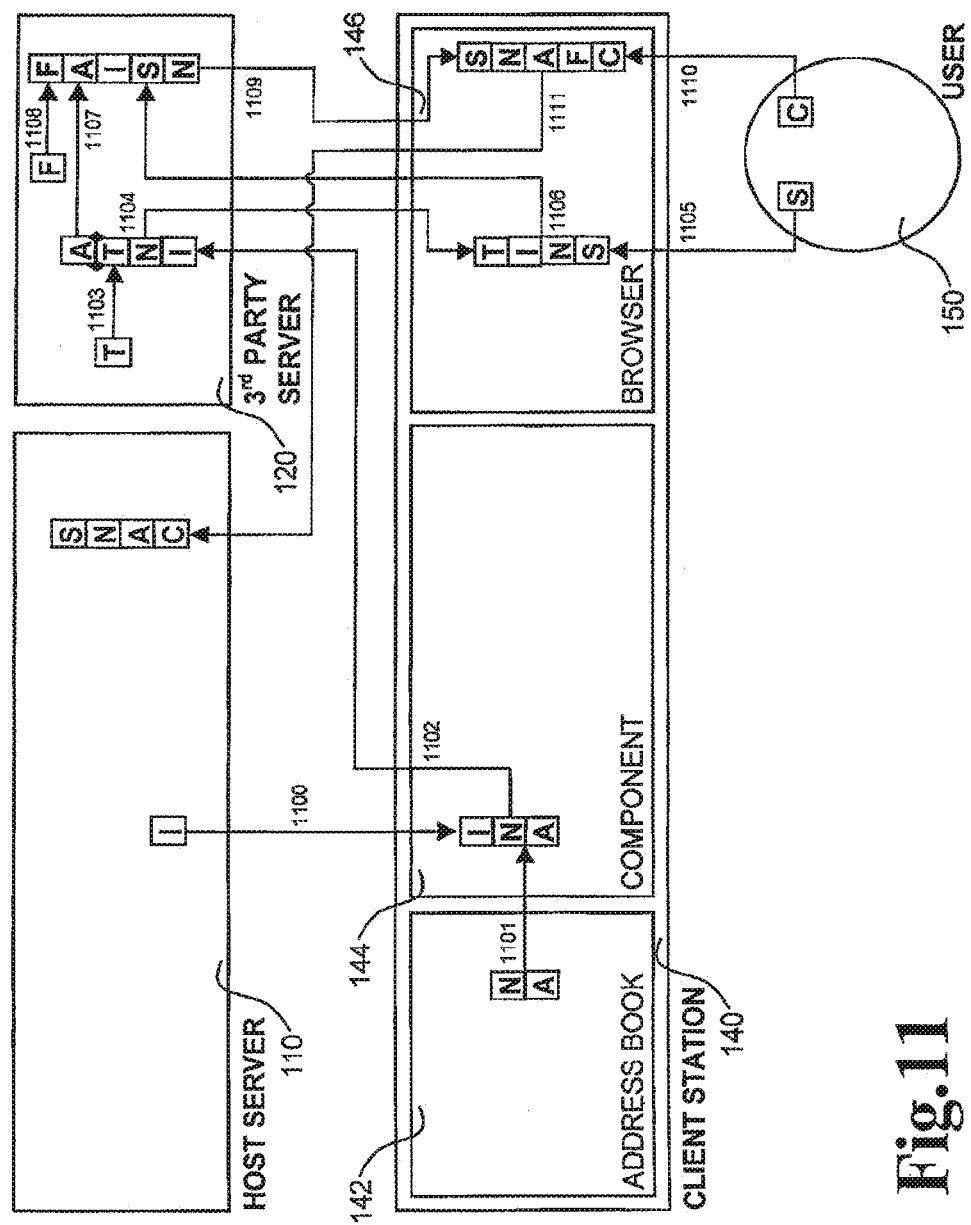
FIG. 11 illustrates a data flow that uses templates on a third party server to construct web pages on the third party server.

The data flow in FIG. 11 is similar to that of FIG. 9 in that both templates [T and F] remain resident on a server.

In FIG. 11, the templates are maintained by a third party server 120 rather than the shopping site host server 110. The advantage of such data flow is that the third party server can host multiple shopping site templates and be responsible for much of the operations of the inventive method; this decreases the size of the client-side component, is conducive to easier upgrading of functionality, and allows for billing the shopping site on a per transaction basis. FIG. 11 illustrates a data flow process that begins with a transaction identity number [I] being sent (1100) from the host server 110 to the component 144 where it joins the names [N] and addresses [A] read (1101) from the address book 142 and posted (1102) to the third party server 120. The third party server 120 then formats (1103) the names [N] with the selection template [T] already resident on the third party server 120. The third party server 120 selects a selection template [T] to use based on the transaction identity number [I] which is site-specific. The resulting selection form is downloaded (1104) and displayed through browser 146. The user 150 selects [S] (1105) names and respective gifts and this data is posted back (1106) to the third party server 120, and combined (1107) with the corresponding address data [A]. The combined data is formatted (1108) with the appropriate server resident shipping information form template [F], which is retrieved using the transaction identity number [I] specific to the shopping site with which the user 150 is interacting. The resulting shipping information form is downloaded (1109) and displayed through the browser 146 so that the user 150 can interact (1110) with the form and make any necessary corrections [C]. The form is then posted (1111) to the original shopping site host server 110, as referenced by the transaction identity number [I], as described above.

Figure 12:
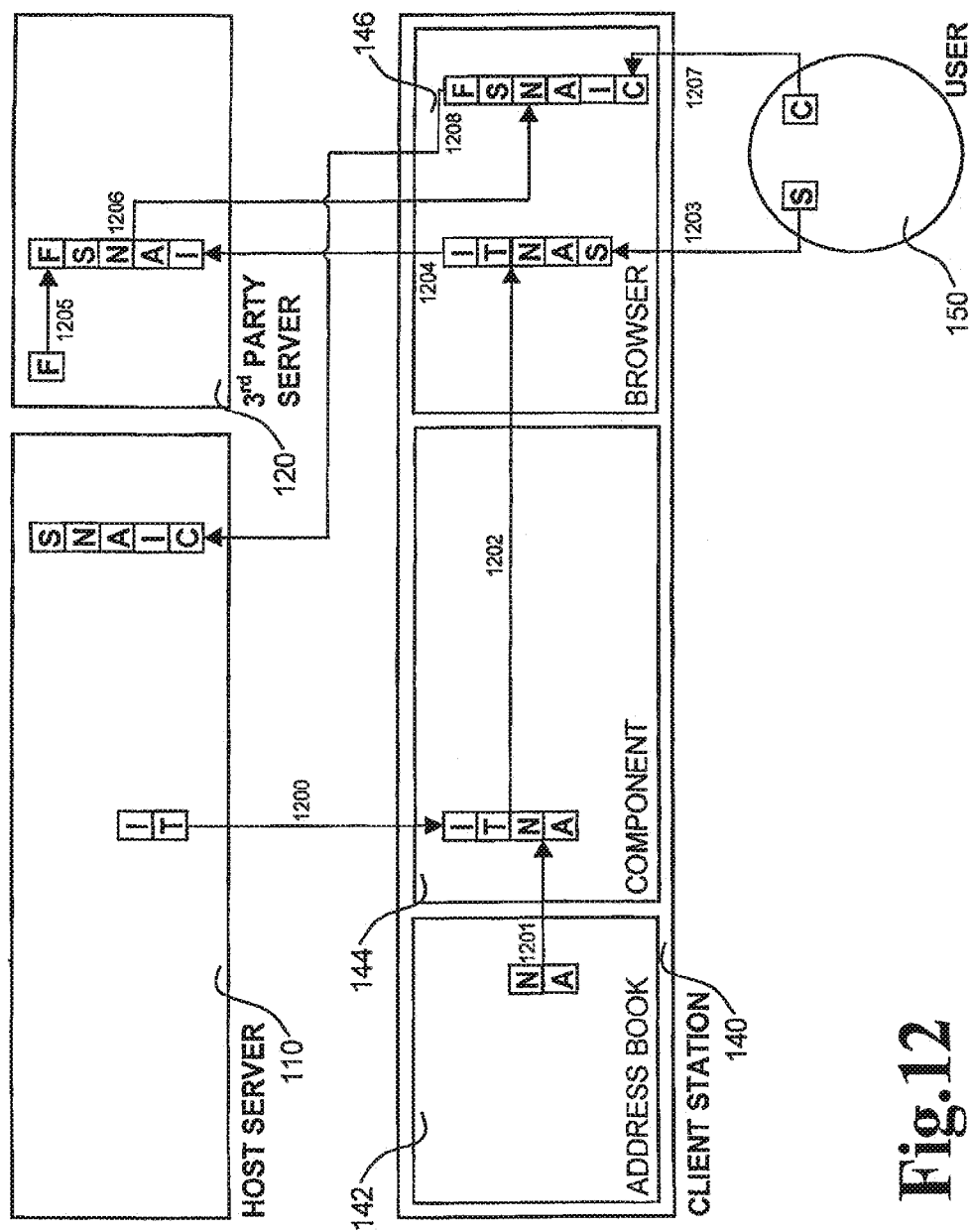
FIG. 12 illustrates a process flow that uses a template passed to the client station component from the host server followed by a template resident on a third party server to construct web pages at respective sites.
Figure 13:
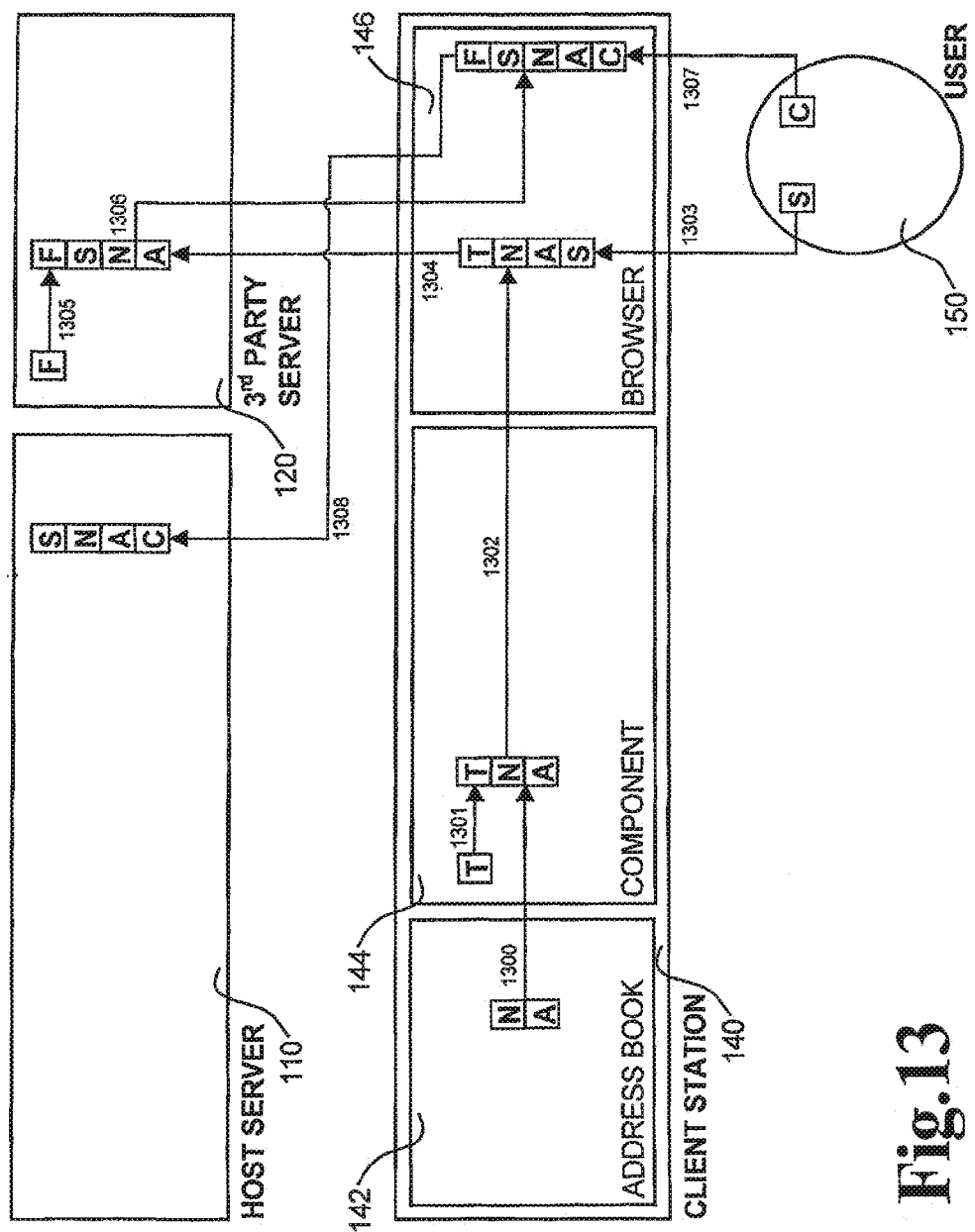
FIG. 13 illustrates a data flow that uses a template built into the client station component followed by a template on a third party server to construct web pages at respective sites.

In FIGS. 12 and 13, only the shipping information form is generated at the third party server 120. FIG. 13 additionally has the selection template [T] resident at the client station in the component 144; the advantages having been substantially described above in connection with FIG. 6-8.

With reference now to FIG. 12 in particular, a data flow process is represented whereby the selection template [T] is passed (1200) to the component 144 along with the transaction identity number [I]. Names [N] and addresses [A] read (1201) from the address book 142 are formatted using the selection template [T]. The selection form is then displayed (1202) through the client station browser 146. The user 150 selects [S] (1203) names and respective gifts and this data is posted (1204) to the third party server 120 along with corresponding addresses [A] which are embedded in the form, but which are invisible to (hidden from) the user 150. Only those addresses corresponding to names selected by the user 150 are posted to the third party server 120. The data is then formatted (1205) on the third party server 120 using the shipping information form template [F] to define a shipping information form. The shipping information form is downloaded (1206) and displayed through the client station browser 146 so that the user can interact (1207) with the form and make any necessary corrections [C]. The form is then posted (1208) to the host server 110 as described above.

With reference now to FIG. 13, a data flow process is represented whereby the names [N] and addresses [A] are read (1300) by the component 144 and formatted (1301) with a component-resident selection template [T] to define a selection form which is displayed (1302) through the client station browser 146. The user 150 selects [S] (1303) names and respective gifts and this data is posted (1304) to the third party server 120 along with corresponding addresses [A] which are embedded in the form, but which are invisible to (hidden from) the user 150. Only those addresses corresponding to names selected by the user 150 are posted to the third party server 120. The data is formatted (1305) on the third party server with the shipping information form template [F] to define a shipping information form. The shipping information form is downloaded (1306) and displayed through the browser 146 so that the user can interact (1307) with the form and make any necessary corrections [C]. The form is then posted (1308) to the host server 110 as described above.

Figure 14:
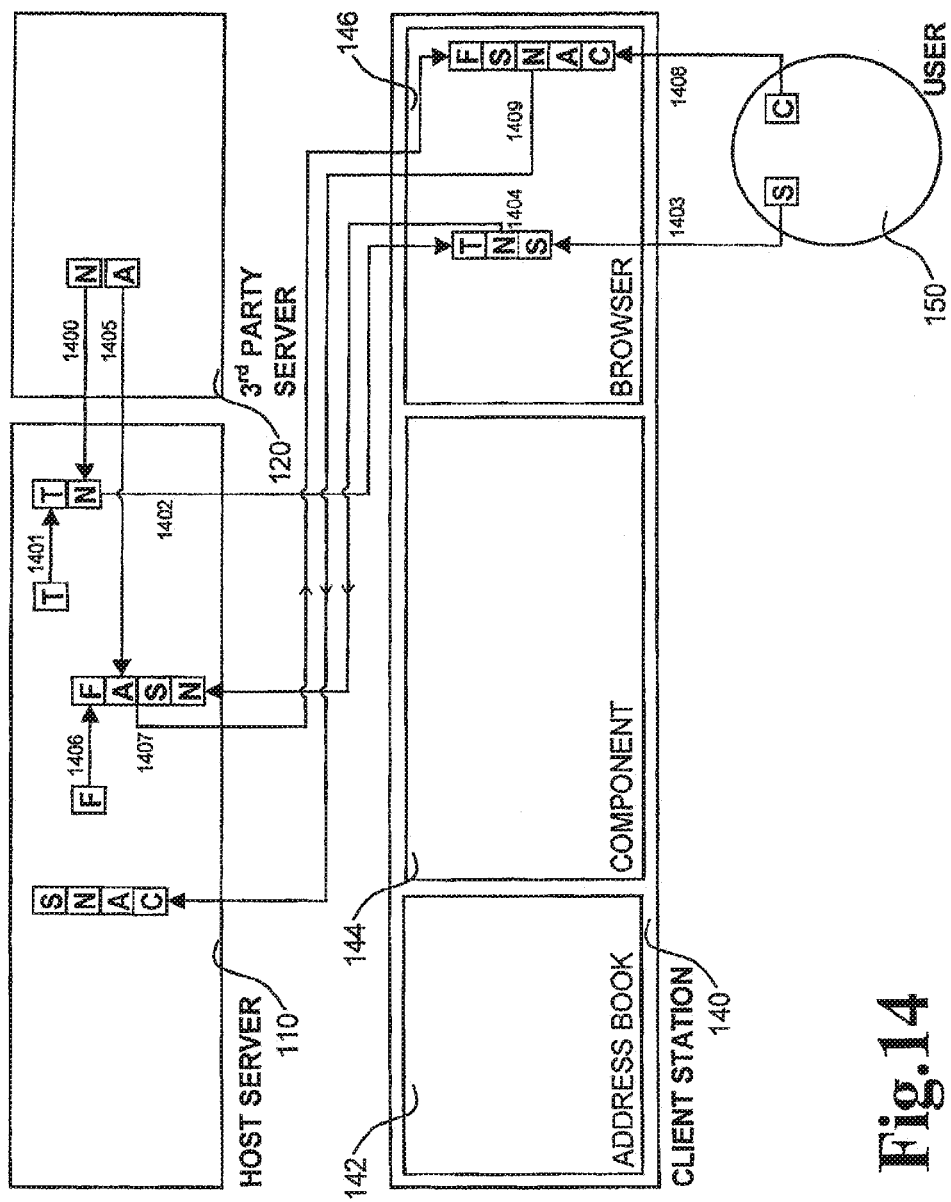
FIG. 14 illustrates a process flow that uses address book data from a third party server to construct web pages on the host server.
Figure 15:
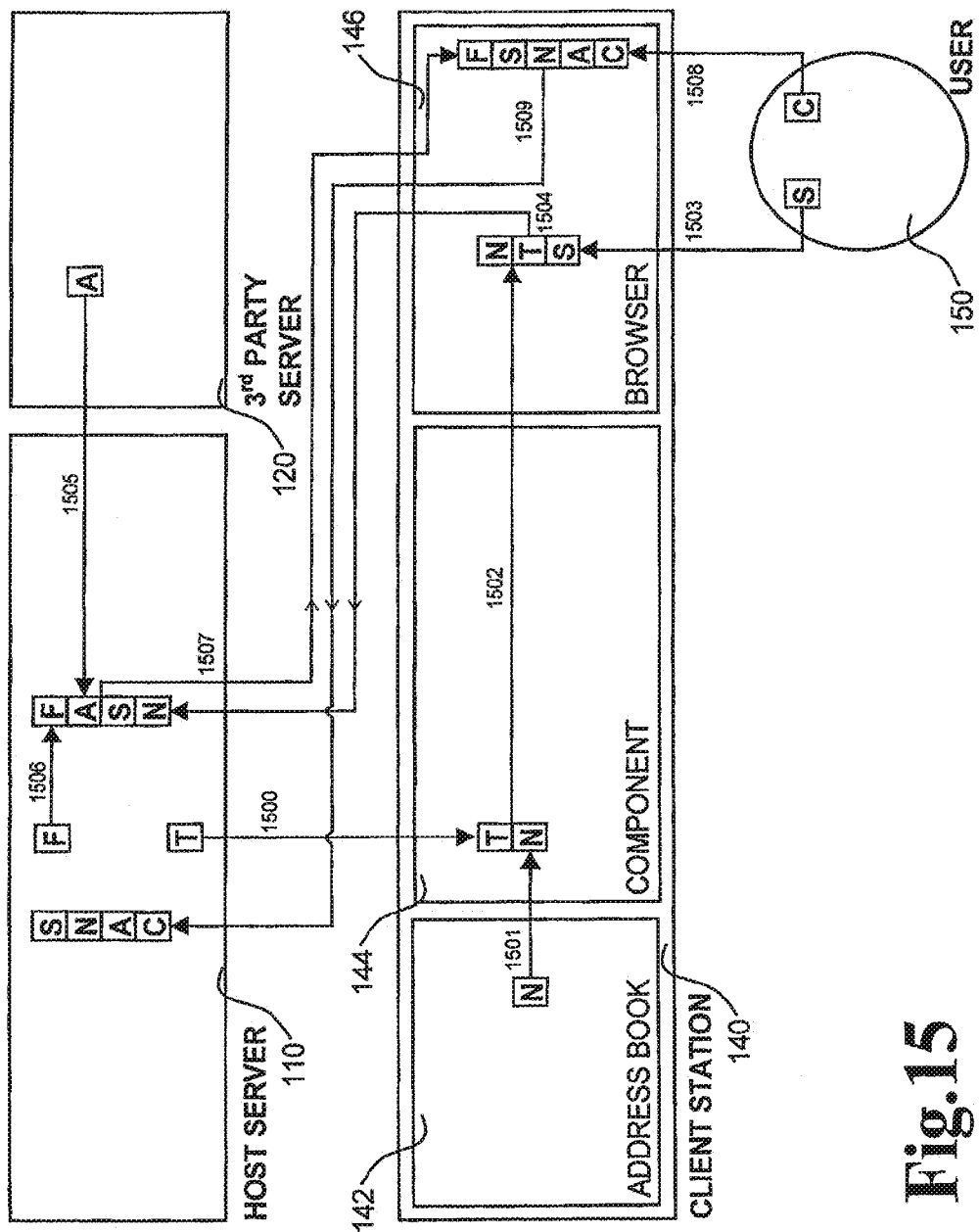
FIG. 15 illustrates a process flow that uses address book data from a third party server corresponding to names extracted from the client station address book to construct web pages on the host server.

The data flow in FIGS. 14 and 15 differ to those represented in former figures in that address book data [N and A] is obtained entirely or partially from a third party server 120; the advantages discussed substantially above with regard to FIG. 1.

With reference now to FIG. 14, a data flow process is represented whereby names are read (1400) by the host server 110 from the third party server 120 and formatted (1401) with a host server resident selection template [T]. The resulting selection form is downloaded (1402) and displayed through the client station browser 146. The user 150 selects [S] (1403) names and respective gifts and this data is sent back (1404) to the host server 110 where it is combined with corresponding addresses [A] read (1405) by the host server from the third party server 120. (The diagram indicates the source to be the same third party server 120 from which the names [N] were originally read, however it need not be the same server.) The combined data is formatted (1406) using the host server resident shipping information form template [F] to define a shipping information form. The shipping information form is downloaded (1407) and displayed through the browser 146 so that the user can interact (1408) with the form and make any necessary corrections [C]. The form is then posted (1409) to the host server 110 as described above.

With reference now to FIG. 15, a data flow process is represented whereby a selection template [T] is downloaded (1500) from the host server 110 to the component 144 and used to format names [N] read (1501) from the address book 142 to define a selection form which is displayed (1502) through the browser 146. The user 150 selects [S] (1503) names and respective gifts and this data is sent (1504) to the host server 110 where it is combined with corresponding addresses [A] read (1505) by the host server from a third party server 120. The combined data is formatted (1506) using a host server resident shipping information form template [F] to define a shipping information form. The shipping information form is downloaded (1507) and displayed through the browser 146 so that the user 150 can interact (1508) with the form and make any necessary corrections [C]. The form is then posted (1509) to the host server 110 as described above.

The component 144, although represented as a single component, can be implemented as separate components. The component can include a portion that is displayable in the browser and operate in the data display and data input process, as described above in connection with the selection form and the shipping information form. By designing the component 144 so that it does not generate HTML which is sent to the browser but instead resides on a web page form and interfaces directly with the user, more interactivity with the user is possible.

The selection template and shipping information form template both have been described in certain data flow processes as being built into the component 144. It can be appreciated, however, that these templates need not be built into the component 144, but can instead exist separately on the client station 140 without affecting the process of data flow described above.

Also, it can be appreciated that names [N] and addresses [A] resident on a third party server may have been previously read from the client station address book 142 and transferred to the third party server for storage. Names [N] and addresses [A] can be, with the user's permission, read from the client station address book 142 and transferred to the host server 110 where the host server address book data for each individual is stored and used appropriately. The third party can be a trusted intermediary which maintains address data that is not accessible to the user 150. For example, the third party can be an ISP such as America Online which can securely and privately provide a host server 110 with address information on a potential gift recipient to which the user does not have access. Such methodologies would fall into the scope of the spirit of this inventive method.

Depending on the data flow, the client station address book 142 can be updated; the user will usually be prompted for permission for the host or third party to do this. Such functionality allows for addresses to be automatically updated in the client station address book 142. Also, any additional gift recipients entered manually on a conventional shipping detail form can be added to the address book. Furthermore, the user can be given the option of having a comment inserted in the memo section of the address book entry of the date and type of gift sent to the person for future reference purposes. This data can be used to guide subsequent gift purchases.

The client station address book used need not reside on the same client station being used by the user; instead, it may reside on another client station connected to a local area network or a wide area network or a virtual private network which has been configured to share, across the LAN, WAN, or VPN, as the case may be, it's address book contents. Such data flow allows, for example, a person to have an assistant on a different client station access his/her address book in order to send gifts to applicable contacts through means of the inventive method.

The inventive method described has utilized web based components for implementation, although a standalone program may implement the inventive method. The user can install such a program (which may be memory resident as understood by those of skill in the art). When the program recognizes that the user has navigated on the client station browser 146 to a web page containing an address form, it can offer in the form of a pop-up window or the like names and addresses from the address book 142 as options for populating the form. The user can easily select one or multiple names with which the program automatically populates the current web form in the browser 146. The program can alternatively not use a pop-up window but rather automatically complete the address fields in any given web based address form when it recognizes the form as such and recognizes the first and last names entered into the form input fields as matching an entry in the client station address book. The inventive method also can be included in an Internet browser or exist in the form of an Internet browser plug-in, as understood by those of skill in the art.

While the present invention has been described with respect to a particularly preferred embodiment, the invention is susceptible to implementation in other ways that are within the spirit of the invention which is defined in terms of the recitations of the appended claims and equivalents thereof.

What is claimed is:

1. A method for facilitating purchases of items comprising:
retrieving at least a set of names of potential item recipients from an address book resident on a third party server;
causing to be displayed at a client station a selection form containing the set of names along with one or more items available through a host server, the selection form enabling interaction, via selectable areas, effective to associate the one or more items available through a host server with at least one or more names in the set of names of potential item recipients; and
causing to be submitted, to the host server, associations between the one or more items available through a host server and the at least one or more names in the set of names of potential item recipients.

2. The method of claim 1, further comprising:
reading, at the client station, client station address book data; and
responsive to the reading, causing the client station address book data to be populated on the third party server.

3. The method of claim 2, wherein the client station address book data is read responsive to a grant of permission to access an associated client station address book.

4. The method of claim 1, wherein enabling interaction with the selection form via selectable areas effective to associate the one or more items with at least one or more names in the set of names of potential item recipients further comprises enabling interaction effective to associate only one item with a name in the at least one or more names in the set of names of potential item recipients.

5. The method of claim 1, wherein the selection form at the client station is configured to display an indication associated with each name of the at least one or more names that an address associated with a corresponding name has been found.

6. One or more hardware components storing instructions which, responsive to execution by a computing device, are configured to cause the computing device to perform operations comprising:
   causing to be displayed a selection form at a client station, the selection form containing (1) a set of names of potential item recipients retrieved from an address book resident on a third party server and (2) one or more items available through a host server, the selection form enabling interaction, via selectable areas, effective to associate the one or more items available through a host server with at least one or more names in the set of names of potential item recipients; and
   causing to be submitted, to the host server, associations between the one or more items available through a host server and the at least one or more names in the set of names of potential item recipients.

7. The one or more hardware components of claim 6, wherein the operations further comprise:
   displaying, on the client station, a shipping information form that includes addresses associated with the names of potential item recipients that are associated with the one or more items.

8. The one or more hardware components of claim 7, wherein the shipping information form is configured to enable editing of the addresses associated with the names of potential item recipients that are associated with the one or more items.

9. The one or more hardware components of claim 7, wherein the shipping information form is configured to include addresses retrieved from the address book on the third party server.

10. A method for facilitating purchases of items comprising:
    receiving a set of names of potential item recipients retrieved from an address book resident on a third party server;
    displaying, at a client station, a selection form wherein the selection form includes at least one name in the set of names of potential item recipients from the address book on the third party server combined with one or more items that are available through a host server;
    enabling interaction with the selection form, via selectable areas, effective to associate the one or more items available through a host server with at least one or more names in a set of names of potential item recipients displayed in the selection form; and
    causing to be submitted, to the host server, associations between the one or more items available through a host server and the at least one or more names in the set of names of potential item recipients.

11. The method of claim 10, further comprising:
    reading, at the client station, client station address book data; and
    responsive to the reading, causing the client station address book data to be populated on the third party server.

12. The method of claim 11, wherein the client station address book data is read responsive to a grant of permission to access an associated client station address book.

13. The method of claim 10, wherein addresses associated with names of the set of names of potential item recipients from the address book on the third party server are not displayed at the client station.

14. The method of claim 10, further comprising:
    displaying, on the client station, a shipping information form that includes addresses associated with the names of potential item recipients that are associated with the one or more items.

15. The method of claim 14, wherein the shipping information form is configured to enable editing of the addresses associated with the names of potential item recipients that are associated with the one or more items.

16. The method of claim 14, further comprising:
    receiving a shipping information form template; and
    basing the shipping information form, at least in part, on the shipping information form template.

17. The method of claim 14, wherein the shipping information form is configured to enable manual entry of addresses in the shipping information form.

18. The method of claim 10, wherein enabling interaction with the selection form via selectable areas effective to associate the one or more items with at least one or more names in the set of names of potential item recipients further comprises enabling interaction effective to associate only one item with a name in the at least one or more names in the set of names of potential item recipients.

19. The method of claim 10, wherein the selection form includes a custom message section that is configurable to associate a custom message with at least one of the associations between the one or more items available through a host server and the at least one or more names in the set of names of potential item recipients.

* * * * *